United States Patent [19]

Collins et al.

[11] Patent Number: 4,985,477

[45] Date of Patent: Jan. 15, 1991

[54] METHOD OF PRODUCING TREATED SILICA FILLER FOR SILICONE RUBBER

[75] Inventors: Warde T. Collins; Kenneth R. Cottrell; John C. Saam, all of Midland, Mich.

[73] Assignee: Dow Corning Corporation, Midland, Mich.

[21] Appl. No.: 401,607

[22] Filed: Aug. 30, 1989

Related U.S. Application Data

[63] Continuation-in-part of Ser. No. 193,626, May 13, 1988, abandoned.

[51] Int. Cl.$^5$ ................................................ C08K 9/06
[52] U.S. Cl. ..................................... 523/212; 523/213; 106/490; 428/405
[58] Field of Search ................ 527/212, 217; 106/490; 428/405

[56] References Cited

U.S. PATENT DOCUMENTS

| | | | |
|---|---|---|---|
| 2,993,809 | 7/1961 | Bueche et al. | 117/100 |
| 3,024,126 | 3/1962 | Brown | 106/308 |
| 3,128,196 | 4/1964 | Pierpoint | 106/308 |
| 3,635,743 | 1/1972 | Smith | 106/288 Q |
| 3,677,784 | 7/1982 | Nitzche | 106/490 |
| 3,847,848 | 11/1974 | Beers | 260/18 S |
| 3,920,865 | 11/1975 | Laufer et al. | 427/220 |
| 3,929,718 | 12/1975 | Kratel et al. | 260/375 B |
| 4,111,890 | 9/1978 | Getson et al. | 260/375 B |
| 4,164,509 | 8/1979 | Laufer | 260/448.8 R |
| 4,454,288 | 6/1984 | Lee et al. | 524/588 |
| 4,724,167 | 2/1988 | Evans et al. | 427/221 |

FOREIGN PATENT DOCUMENTS

| | | |
|---|---|---|
| 0251176 | 1/1988 | European Pat. Off. . |
| 1951620 | 5/1971 | Fed. Rep. of Germany . |
| 2513608 | 10/1976 | Fed. Rep. of Germany . |
| 682574 | 11/1952 | United Kingdom . |
| 1371218 | 10/1974 | United Kingdom . |
| 1420345 | 1/1976 | United Kingdom . |

*Primary Examiner*—Melvyn I. Marquis
*Assistant Examiner*—Ralph H. Dean, Jr.
*Attorney, Agent, or Firm*—Edward C. Elliott

[57] ABSTRACT

An improved method of producing treated silica filler for use with silicone rubber operates at ambient temperature in a short period of time. The method consists essentially of mixing reinforcing silica with a volatile treating agent of the formula $R_xSi(OR')_{4-x}$, wherein R is a substituted or unsubstituted, saturated or unsaturated, alkyl or aryl radical having from 1 to 6 carbon atoms, R' is an alkyl radical having from 1 to 3 carbon atoms, x is 1 or 2, and R and R' are chosen so that the vapor pressure of the alkoxysilane exceeds 10 Pa (0.0001) atmosphere) at treatment temperature, in combination with a volatile catalyst selected from the group consisting of acid A, base B, and mixtures thereof; wherein acid A is a volatile acid or acid progenitor, and base B is a silylamine or silazane, acid A and base B being chosen so that the vapor pressure of either acid A or base B exceeds 500 Pa (0.005 atmosphere) at treatment temperature, for a period of time sufficient to allow the desired amount of treating agent to be absorbed onto the surface of the particulate filler.

31 Claims, No Drawings

METHOD OF PRODUCING TREATED SILICA FILLER FOR SILICONE RUBBER

This is a continuation-in-part of copending application Ser. No. 193,626 filed on May 13, 1988, now abandoned.

BACKGROUND OF THE INVENTION

1. Field of the Invention

This invention relates to a method of producing treated silica filler for silicone rubber, and to the filler so produced.

2. Background Information

A method for making treated silica fillers is taught in U.S. Pat. No. 2,993,809, issued July 25, 1961. Newly formed fumed silica, while at a temperature below 500° C. is contacted with an organohydrolyzable silane. The silica is formed by combustion of silicon tetrachloride in the presence of hydrogen and oxygen, the amount of hydrogen being in excess so as to form sufficient water to convert all the silicon-bonded chlorine atoms in the silicon tetrachloride to silanol groups and to effect hydrolysis of the organohydrolyzable silane.

A method of treating reinforcing silica is taught in U.S. Pat. No. 3,024,126, issued Mar. 6, 1962. The method disperses a silica in an organic solvent and adds an organosilicon compound having hydroxyl or alkoxy radicals. There is also present a compound compatible with the solvent and selected from the group consisting of an amino compound having a basic dissociation constant in dilute solution in water of at least $10^{-7}$ at 25° C., a quaternary hydrocarbon-substituted ammonium hydroxide, a salt of a phosphoric acid, and a salt of a carboxylic acid. Included are such materials as ammonia, certain organic amines, and silylorganic amines, such as $[Me_3Si(CH_2)_n]CHNH_2$.

Silica is surface modified in U.S. Pat. No. 3,128,196, issued Apr. 7, 1964, by preferably fluidizing the silica and injecting a mixture of a liquid cyclic silane and a phenyl containing organosilicone compound having alkoxy groups.

Offenlegungsschrift No. 1,951,620, publication date of May 6, 1971, discloses a process for preparing hydrophobic, finely divided silicon dioxide. The process reacts silicon dioxide with from 1 to 10 percent by weight organoalkoxysilanes in the presence of amino compounds, the silane and amino compound being in the gaseous state at least a major portion of the reaction time, the reaction time typically being greater than 10 days.

An improved reinforcing silica filler is taught in U.S. Pat. No. 3,635,743, issued Jan. 18, 1972, as being made by first treating a reinforcing silica filler with ammonia and then with hexamethyldisilazane. The process claimed requires the silica to contain at least 0.2 weight percent of absorbed water at the beginning of treating. The ammonia can be replaced with primary amines and aminoxy compounds, and the hexamethyldisilazane with other silylamines and disilazanes.

British Application No. 1,371,218, published Oct. 23, 1974, and U.S. Pat. No. 4,164,509, issued Aug. 14, 1979, teach a process for hydrohobizing finely divided oxides. For example, a silicon oxide, having a water content of less than 1 percent by weight is intensively mixed, as in a fluidized bed, with a hydrolyzable metal or metalloid compound of the general formula $M(OR)_4$, where M can be silicon. The oxide can be treated with dry ammonia gas before, during, or after the admixture of the oxide with the ester compound.

A specially treated filler is used in a two-part room temperature vulcanizable silicone rubber composition described in U.S. Pat. No. 3,847,848, issued Nov. 12, 1974. The filler is prepared by intimately contacting silica filler, containing from 0.2 to 2.0 percent by weight of moieties selected from water, hydroxyl groups, and mixtures thereof, with a hydroxyl amine, a cyclic siloxane, and a silyl nitrogen compound of the formula $(R^4{}_3Si)_aX$, where X is a nitrogen containing group. Preferably the treatment is carried out at a temperature of from 100° to 180° C., while the filler is being continuously agitated.

A process for hydrophobizing highly dispersed metal or metalloid oxides is described in U.S. Pat No. 3,920,865 issued Nov. 18, 1975. After drying the particles as a fluidized bed at a temperature of 600° to 1000° C. the dried particles are charged with at least one gas-phase organosilicon compound at a temperature of from 25° to 650° C., reacted at a temperature of from 35° to 650° C., and heated to from 125° to 500° C.

A filler which is subjected to mechanical stress and reacted with an organosilicon compound of the formula $(R_3Si)_aZ'$ is described in U.S. Pat. No. 3,929,718, issued Dec. 30. 1975. R is a monovalent hydrocarbon radical or substituted monovalent hydrocarbon radical having up to 18 carbon atoms. Z' is a halide, hydrogen or a radical of the formula OH, OR', NR'X, ONR'$_2$, SR', OOCR', O, N(CX), or S where R' is an alkyl or aryl radical and X is hydrogen or R'. Other organosilicon compounds which can be reacted are dimethyldichlorosilane, dimethyldiethoxysilane, diphenyldiethoxysilane, vinylmethyldimethoxysilane, octamethylcyclotetrasiloxane and/or dimethylpolysiloxanes having from 2 to 12 silicon atoms per molecule and having an Si-bonded hydroxyl group on each of the terminal units. The treated filler is used in organopolysiloxane elastomers.

U.S. Pat. No. 4,111,890, issued Sept. 5, 1978, contains a discussion of fillers suitable in curable organopolysiloxane compositions containing titanium esters. Included are treated fumed silicas, as well as other metallic oxides. It is preferred that the fillers be treated with organosilicon compounds to impart hydrophobic properties thereto. Organosilicon compounds which may be used are those having the general formula $(R'''{}_3Si)_eZ$ or $R'''{}_eSiZ'_{4-e}$, wherein $R'''$ which may be the same or different represents monovalent hydrocarbon radicals and halogenated monovalent hydrocarbon radicals, Z and Z' represent halogen, hydrogen, or a radical of the formula OR'''', —NR''''X', —ONR'''', —SR'''', or —OOCR'''' and when e is 2, then Z may also represent —O—, —NX'—, or —S—; R'''' is a hydrocarbon radical or a substituted hydrocarbon radical, X'' is hydrogen or has the same meaning as R''''; e is 1 or 2, and e' is 1, 2, or 3.

A method of surface treating particulate inorganic fillers with a surface-treating agent is taught in U.S. Pat. No. 4,454,288, issued June 12, 1984. The surface treating agent is an equilibrated reaction mixture consisting essentially of a specified ratio of $R_2SiO_{2/2}$ units, $RSiO_{3/2}$ units, and $CH_3O_{1/2}$ radicals. When reinforcing silica filler is treated in such a method, it is useful with polydiorganosiloxanes curable to elastomers.

Blitz, Murthy, and Leyden teach in an article "Ammonia-Catalyzed Silylation Reactions Cab-O-Sil with Methoxymethylsilanes", JACS, 109,(23) 7141 (1987) that ammonia can be used to catalyze the reactions of methoxymethylsiloxanes with fumed silica in dry toluene medium. High temperature post-reaction curing is unnecessary for silylation to occur in either "dry" or "wet" Cab-O-Sil.

SUMMARY OF THE INVENTION

A rapid and economical method of producing treated, reinforcing silica, for use in silicone rubber, consists essentially of admixing the filler with a volatile treating agent of the formula $RSi(OR')_3$ or $R_2Si(OR')_2$ in the presence of catalytic amounts of base promoters, the base promoters consisting of silylamines or silazanes, or combinations of acid and base promoters.

It is an object of this invention to produce treated, reinforcing silica, at moderate temperature in the absence of solvent, without long contact times, and without the necessity of preheating or drying the silica.

It is an object of this invention to produce treated, reinforcing silica which requires a minimum of energy in order to disperse it rapidly into polydiorganosiloxane gum.

It is an object of this invention to produce a reinforcing silica having a modified surface so that crepeing is diminished when the treated filler is dispersed in a silicone polymer, yet providing improved handling properties prior to cure, and improved mechanical properties after cure and after heat aging.

DESCRIPTION OF THE INVENTION

This invention relates to a rapid method of treating the surface of reinforcing silica filler, said method consisting essentially of mixing, at a temperature of from about $-10°$ to $130°$ C., (A) 100 parts by weight of reinforcing silica filler having a surface area of greater than 50 $m^2/g$, and having from 0.5 to 6 parts by weight of absorbed moisture, (B) from 3 to 30 parts by weight of a volatile treating agent of the formula $R_xSi(OR')_{4-x}$, wherein R is a alkyl, alkenyl or aryl radical having from 1 to 6 carbon atoms which may be substituted with halogen atoms. R' is an alkyl radical having from 1 to 3 carbon atoms, x is 1 or 2, and R and R' are chosen so that the vapor pressure of the alkoxysilane exceeds 10 Pa (0.0001 atmosphere) at treatment temperature, (C) from 0.001 to 5.0 parts by weight of a volatile catalyst selected from the group consisting of base B, and mixtures of acid A and base B, wherein acid A is a volatile acid or acid progenitor, and base B is a silylamine or silazane, acid A and base B being chosen so that the vapor pressure of either acid A or base B exceeds 500 Pa (0.005 atmosphere) at treatment temperature, for a period of time sufficient to allow the desired amount of treating agent to be adsorbed onto tbe surface of the particulate filler, to yield a filler which requires a minimum of energy to disperse rapidly into polydiorganosiloxane and which gives improved properties to cured silicone elastomers.

Silicone elastomers consist essentially of polydiorganosiloxane reinforced with filler. The polydiorganosiloxane ordinarily contains a small amount of hydroxyl radical left from the method of manufacture. The polydiorganosiloxane is transformed from a fluid or gum into an elastomer by crosslinking, either through the addition of a crosslinking agent or through the formation of crosslinks between the radicals present on the polymer chain, both in the presence of a catalyst. The elastomer formed is very Weak mechanically when compared to the common organic elastomeric materials. The silicone elastomers are commonly improved by the addition of reinforcing and extending fillers to modify their physical properties. A well known method of improving the physical strength of silicone elastomers is through the addition of reinforcing silica fillers. In order to act as reinforcing agents, the particles of filler need to be very small, the most common method of designating the particle size is by stating the surface area of the particles, stated as square meters of surface per gram of filler. The useful lower limit of reinforcing filler for polydiorganosiloxane is commonly agreed to be about $50 m^2/g$. The most common filler for silicone elastomer is silica, both fumed silica and precipitated silica, with fumed silica preferred as it normally has a lower moisture content.

When these finely divided reinforcing fillers are mixed into polydiorganosiloxane, there is a reaction between the two which results in a thickening of the mixture. In the case of polymers of gum viscosity, the thickening can result in a mixture which is difficult to further process. This process, known as crepeing, has been prevented to a lesser or greater degree through the use of process aids added at the time of the addition of the filler to the polymer. The filler has also been treated before use, usually with a silane, in an attempt to prevent the crepeing reaction. The method of this invention results in a treated filler which is very easy to mix into &he polymer and yields a mixture which has a reduced tendency to crepe.

The reinforcing silica filler (A) used in the method of this invention is a well known, commercial material. The method of producing the filler is not critical, both precipitated and fumed fillers are suitable. The preferred filler is fumed silica, since it is readily available in commercial quantities.

These finely divided fillers absorb water on their surface if they are exposed to the air. For example, a fumed silica stored at room conditions of $23°$ C. and 50 percent relative humidity, having a surface area of about 250 $m^2/g$, will contain about 2 percent of moisture on its surface. The method of this invention does not require that the surface of the filler be without moisture, or that the amount of moisture be at an exact level, as long as some moisture is present to hydrolyze the treating agent. A practical lower limit is about 0.5 percent by weight, while a practical upper limit is about 6 percent by weight. When more than about 6 percent moisture is present, at least in the case of fumed silica, the filler tends to form clumps and is more difficult to disperse.

The volatile treating agent used in the method of this invention is of the formula $R_xSi(OR')_{4-x}$, wherein R is a substituted or unsubstituted, saturated or unsaturated, alkyl or aryl radical having from 1 to 6 carbon atoms, R' is an alkyl radical having from 1 to 3 carbon atoms, x is 1 or 2, and R and R' are chosen so that the vapor pressure of the alkoxysilane exceeds 10 Pa (0.0001 atmosphere) at treatment temperature. R represents radicals such as methyl (Me), ethyl (Et), propyl, hexyl, vinyl, phenyl, and 3,3,3-trifluoropropyl. R' represents methyl, ethyl, and propyl radicals. Preferred treating agents are $MeSi(OMe)_3$ )(methyltrimethoxysilane) and $Me_2Si(OMe)_2$ (dimethyldimethoxysilane). Mixtures of treating agents can also be used The preferred treating agents can be used at room temperature since their vapor pressures are 3500 Pa (0.035 atmosphere) and 6500 Pa (0.064 atmosphere) at $20°$ C. respectively for $MeSi(OMe)_3$ (methyltrimethoxysilane) and $Me_2Si(OMe)_2$ (dimethyldimethoxysilane).

The amount of treating agent used can vary from 3 to 30 parts by weight, based upon 100 parts by weight of the filler. For fumed silica as the filler, a preferred amount is from 5 to 20 parts by weight. The optimum amount of treating agent used is determined as follows. The selected filler is treated with a range of amounts of treating agent, as well as a range of catalyst amounts. The treated filler samples are then used to prepare samples of the desired final product and the properties of the final product are evaluated. A comparison of the resulting properties indicates the optimum level of treating agent and catalyst to use that particular instance. The examples of this application show such procedures. Filler treated according to this invention shows lower power requirements for mixing filler into high viscosity polymer, lower mill softening times, a less tacky compound, lower Williams Plasticity Number and Recovery, and improved properties of a cured silicone rubber when the filler is used in a curable composition. In the case of high consistency silicone rubber stocks, an additional benefit is seen in the fact that a given durometer cured rubber can be produced with significantly lower fumed silica content, resulting in a more economical product than can be produced when using untreated filler.

The treatment of the reinforcing silica filler surface is catalyzed by from 0.001 to 5.0 parts by weight of a volatile catalyst, based upon 100 parts by weight of reinforcing silica filler. A preferred amount is from 0.001 to 2 parts. The volatile catalyst is selected from the group consisting of acid base B, and mixtures of acid A and base B; wherein acid A is a volatile acid or acid progenitor, and base B is a silylamine or silazane, acid A and base B being chosen so that the vapor pressure of either acid A or base B exceeds 500 Pa (0.005 atmosphere) at treatment temperature. A volatile acid or base is defined as that having the required vapor pressure. The acid A can be any acid or acid progenitor having the required volatility, preferred are catalysts selected from the group consisting of hydrogen chloride (HCl), hydrogen bromide (HBr), methyltrichlorosilane (MeSiCl$_3$), and dimethyldichlorosilane (Me$_2$SiCl$_2$). An acid progenitor is defined as a material that gives an acid when it contacts water or water vapor. Most preferred are methyltrichlorosilane and dimethyldichlorosilane. The base B can be a silylamine or silazane selected from the group consisting of (R"$_3$Si)$_2$NR, (R"$_3$Si)$_2$NH, R"$_3$SiNR"$_2$, and R"$_3$SiNHR", where R" is the same as R' and is an alkyl radical having from 1 to 3 carbon atoms. Most preferred is hexamethyldisilazane (Me$_3$Si)$_2$NH. Mixtures of catalysts can also be used. The most preferred catalysts can be used at room temperature because their vapor pressures at 20° C. are 18,200 Pa (0.18 atmosphere) for methyltrichlorosilane, 15,200 Pa (0.15 atmosphere) for dimethyldichlorosilane, 25,300 Pa (0.25 atmosphere) for trimethylchlorosilane, and 2,600 Pa (0.026 atmosphere) for hexamethyldisilazane.

The acid (A) and base (B) are well known materials as to the means of manufacture. The base (B) silazanes can also be produced by an in situ process where, for example, a chlorosilane, such as dimethyldichlorosilane, and an amine, such as ammonia, are added to the filler and allowed to react to give a silazane.

The method of this invention makes use of a gaseous treatment of the particulate filler. The treating agent and the catalyst are both of sufficient volatility at the treatment temperature to create an atmosphere in the treating chamber which contains sufficient treating agent and catalyst to treat the filler surface. The preferred method of treatment stirs the filler in a container whose contents can be agitated and purged with an inert gas. The effect can be obtained by circulating a gas through the bed at a sufficient rate to fluidize the filler, or through rapid stirring or tumbling. The treating agent and catalyst are added to the container so that they are vaporized and deposited upon the filler surface. The temperature at which the treatment takes place is determined by the treating agent and catalyst used. When methyltrimethoxysilane and/or dimethyldimethoxysilane are used as treating agent with methyltrichlorosilane, dimethyldichlorosilane, and/or hexamethyldisilazane used as catalyst, the treatment occurs very successfully at room temperature, defined herein as 10° C. to 30° C., in a period of time from about 3 to 10 minutes. If a higher boiling treating agent, such as diphenyldimethcxysilane, is used, the treatment temperature must be raised so that the concentration of treating agent in the fluidized bed is sufficient to adequately treat the filler. An upper temperature of 130° C. is sufficient when using the treating agents and catalyst specified in this invention.

The treating agent and catalyst can be added to the mixing chamber in any order, but the preferred order is first adding the filler and fluidizing it, then adding the catalyst to give an activated filler surface, then adding the treating agent.

It is not necessary to further process the treated filler after the method of this invention to remove excess reactants, because only an amount of the catalyst and treating agent are added to the mixture at the time of the treatment process to give the desired properties. The small amounts of treating agent and catalyst used and the short time of treatment gives a treated filler with a minimum cost.

The usefulness and uniqueness of the filler resulting from the method of this invention can be shown by adding it to polydiorganosiloxane and comparing the product resulting (herein referred to as a base) with a similar product produced with untreated filler or filler not treated in accordance with this invention. The simplest comparison is done by mixing 30 parts by weight of filler into a polydimethylsiloxane having a viscosity of about 25,000 Pa.s (Williams Plasticity Number of about 150) and measuring the Williams Plasticity Number initially and over a period of time. A description of this plasticity test is found in ASTM D-926. Briefly, a piece of base weighing approximately 2 times the specific gravity is rolled into a ball and allowed to sit for 1 hour. It is then placed between two parallel plates in a Plastometer which applies a load to the sample, causing it to flow. After 3 minutes time, the thickness of the sample is measured and the load removed. After 1 minute, the thickness of the sample is remeasured. The Williams Plasticity Number is the thickness of the sample after the 3 minute load period in millimeters times 100. The Recovery is the final Williams Plasticity Number minus the original Williams Plasticity Number. The Williams Plasticity Number is a measure of how stiff the material is; the higher the number, the stiffer the mixture. If the measurement is made at various times over a period of time after the original mixing of the gum and filler, it gives an indication of how the filler and gum are interacting to produce a crepe. The recovery gives an indication of how resilient the mixture is. A low number means the material is more like a fluid, while a higher number means the material is becoming like an elastomer.

Another common method of evaluating the usefulness of a filler treatment is measuring the softening time of the mixture on a two roll mill. A given amount of material is placed upon a two roll mill and the time necessary for the material to soften to the point where it wraps around the faster roll is measured. When the roll speed, nip opening, and sample size are similar, it gives a useful comparison between bases. The faster the base softens, the less a crepe has formed. Again, running this test repeatedly over a period of time can be used to indicate how much a base crepes and how fast the reaction is occurring.

A more revealing method of evaluating the effects of filler treatment can be performed by using a Haake Rheochord ™ system. This is essentially a laboratory size sigma blade mixer that is instrumented so that the torque required to turn the mixer blade is measured and recorded. A graph of the torque versus time can be generated. By using a standardized procedure, comparisons between fillers as to their effect upon the base can be measured. The graph shows how much energy is required to mix the filler into the polymer and how much thickening of the base takes place during the mixing operation. The higher the final torque, the higher the viscosity of the base that has been produced. The easier and quicker the filler disperses in the polymer, the less energy is required for this manufacturing step and the lower the cost of production.

The usefulness of the treated filler produced by the method of this invention and comparisons to other treated and untreated fillers is best demonstrated by a series of examples The following examples are used to show the uniqueness of the treated filler of this invention. The discussion of the comparisons is found in the discussion of the examples and the results obtained.

The following examples are included for illustrative purposes only and should not be construed as limiting the invention which is properly set forth in the appended claims.

EXAMPLE 1

This example illustrates the effectiveness of the type of alkoxysilane used to treat fume silica.

First 125 g of fumed silica with a surface area of 255 $m^2/g$ and a moisture content of 2.2 percent (established by measuring weight loss on heating for 1 hour at 105° C.) was placed in a one gallon stainless steel Waring Blender and agitated at a slow speed through the use of a Variac in the line to slow the motor. The stirrer was operated at a speed just sufficient to fluidize the silica in the blender. The blender has a cover which allows an inert gas purge of the space over the filler. Since the treating agents are flammable, it is necessary to maintain an atmosphere in the blender which is low in oxygen. Nitrogen was passed through the blender and exhausted into a bubbler so that the rate could be observed and adjusted. This is followed by the addition of 2.5 g hexamethyldisilazane and mixing for 3 minutes. Then 12.5 g of $Si(OEt)_4$ was added and mixed for 3 additional minutes, at which time the mixer was turned off. Similiar samples were prepared using the same amount of $MeSi(OMe)_3$, $Me_2Si(OMe)_2$, or $Me_3SiOMe$ in place of the $Si(OEt)_4$.

The treated filler was evaluated as a reinforcing filler by compounding 30 parts of treated filler into 100 parts of polydiorganosiloxane gum. The gum contained about 0.14 mol percent vinyl radicals and the rest methyl radicals with dimethylvinylsiloxy endblockers. It had a William's Plasticity Number of 152. The compounding was done in a Haake Rheochord System 40 sigma blade mixer at a blade speed of 35 rpm. The filler was added in 8 equal increments, each being added every two minutes. A curve of the torque required by the mixer versus time was recorded to show the power required to mix the treated filler into the gum.

The softening time of each base was measured by recording the time in seconds for the base to transfer from the slow roll to the fast roll on an 8 inch two roll mill. This test is an indication of polymer/filler interaction and is a qualitative measure of how well the filler is treated. The comparative results are shown in Table I.

The Williams Plasticity of each compound was measured when compounded and over time in accordance with ASTM D926, with the results shown in Table I. The torque curves and plasticity data indicate that these fillers could be used in compounding without using the plasticizers commonly added during compounding of silicone rubber in order to prevent creping of the base during storage.

Each base was evaluated as a silicone rubber stock by mixing 100 parts of each compound with 0.7 parts of 2,5 bis(tert-butylperoxy)-2,5-dimethylhexane peroxide (Lupersol 101). The catalyzed stock was pressed into a sheet and vulcanized for 10 minutes at 171° C. followed by an oven cure of 4 hours at 200° C. Each base was also evaluated as a silicone rubber stock by mixing 100 parts of each compound with 1.3 parts of a paste containing 50 percent of 2,4 dichlorobenzoyl peroxide (Cadox TS50). The catalyzed stock was pressed into a sheet and vulcanized for 5 minutes at 116° C. followed by an oven cure of 4 hours at 200° C. The cured silicone elastomers were evaluated for physical properties by measuring in accordance with ASTM procedures. The results are shown in Table I.

The treated silica was evaluated as a reinforcing filler in the manner described above. A comparison of the results in Table I shows $Me_2Si(OMe)_2$ to be the most efficient treating agent, followed by $MeSi(OMe)_3$, then $Me_3SiOMe$, with $Si(OEt)_4$ being the least effective. A higher level of filler treatment corresponds with the base having a lower final Haake torque, shorter mill softening time, and lower plasticity and recovery. It also can be seen in a lower Shore A durometer, a higher elongation and lower modulus.

TABLE I

| Treating Agent: | Me2Si(OMe)2 | MeSi(OMe)3 | MeSiOMe | Si(OEt)4 |
|---|---|---|---|---|
| Property: | | | | |
| Haake Final Torque, mg | 2372 | 3035 | 3318 | Crumbled |
| Mill Softening Time, seconds | 31 | 62 | 137 | 274 |
| Williams Plasticity Number | | | | |
| Initial | 213 | 345 | 429 | 607 |
| After 1 week | 269 | 422 | 493 | 676 |
| After 1 month | 289 | 447 | 554 | 759 |
| Williams Plasticity, Recovery | | | | |
| Initial | 15 | 18 | 28 | 43 |

TABLE I-continued

| Treating Agent: | Me2Si(OMe)2 | MeSi(OMe)3 | MeSiOMe | Si(OEt)4 |
|---|---|---|---|---|
| After 1 week | 30 | 51 | 94 | 191 |
| After 1 month | 66 | 112 | 168 | 237 |
| Property after Cure | | | | |
| Durometer, Shore A | 42 | 52 | 54 | 58 |
| Tensile Strength, mPa | 8.78 | 8.28 | 7.39 | 7.18 |
| Elongation, percent | 447 | 370 | 348 | 333 |
| 200% Modulus, mPa | 2.42 | 3.2 | 3.1 | 3.38 |
| Compression Set, percent | | | | |
| 0.7 pph Lupersol 101 | 30.2 | 44 | 36.1 | 46.3 |
| 1.3 pph Cadox TS-50 | 62.6 | 77.5 | 46.9 | 70.5 |
| Property after Heat Age, 70 hr/225° C. | | | | |
| Durometer, Shore A | 39 | 51 | 50 | 55 |
| Durometer Change | −3 | −1 | −4 | −3 |
| Tensile Strength, mPa | 4.66 | 5.82 | 5.08 | 5.66 |
| Tensile % Change | −46.9 | −30 | −31 | −21 |
| Elongation, percent | 266 | 293 | 269 | 326 |
| Elongation % change | −40.49 | −21 | −23 | −2 |

EXAMPLE 2

This example shows small amounts of hexamethyl disilazane catalyze the treatment of fumed silica with methyltrimethoxysilane. It also shows the same level of silazane alone is ineffective in sufficiently treating the silica so that it can be used as a reinforcing filler.

A series of treated fumed silicas were prepared by fluidizing 125 g of fume silica of example 1, then adding the amount of hexamethyldisilazane shown in Table II and mixing for 3 minutes. Then the amount of methyltrimethoxysilane shown in Table II was added and mixing continued for 3 minutes, at which time the mixer was turned off. The first 4 runs show the effect of increasing amounts of hexamethyldisilazane catalyst. Run 5 is a comparative example using only hexamethyldisilazane. Runs 6 through 9 are the same ratio of catalyst to treating agent, increasing the amounts used.

Each of the treated silicas from the above runs were evaluated as a reinforcing filler by compounding the treated filler at a loading of 30 parts per 100 parts of the gum described in example 1. The evaluation was done in the manner as described in the same example.

A comparison of the torque data from bases compounded from runs 1-5 is included along with the mill softening time, Williams Plasticity, and cured elastomer properties in Table II. Comparison of the torque data shows hexamethyldisilazane used by itself at 5 g per 125 g fume silica did not treat the filler sufficiently to be useful as a reinforcing filler, as the base crumbled in the mixer during compounding. A comparison of runs 1-4 with the comparative run using only methyltrimethoxysilane shows hexamethyldisilazane catalyzes the filler treatment as can be seen by the lower torque. There was a decrease in the torque(less energy used) which corresponds with an increase in the level of hexamethyldisilazane. A similiar trend is seen in the comparison of bases compounded with the treated filler from runs 6-9. In this case the amount of hexamethyldisilazane and methyltrimethoxysilane was increased, but the ratio of catalyst to treating agent was kept constant. The same trend in the shorter mill softening times and lower plasticity and recovery can be seen. The recovery is the amount the sample recovers after it has been under stress in the Williams Plastometer for the 3 minute test time and allowed to set without stress for one minute. A lower durometer with a higher elongation and lower modulus also corresponds with a higher level of catalyst or both catalyst and treating agent, as is the case for runs 6-9. This data indicates the treatment improves with an increase in catalyst or catalyst and treating agent.

TABLE II

| Run Number | 1 | 2 | 3 | 4* | 5* | 6 | 7 | 8 | 9 |
|---|---|---|---|---|---|---|---|---|---|
| Hexamethyldisilazane, g/100 g silica | 4 | 2.6 | 1.2 | 0 | 4 | 1 | 2 | 3 | 4 |
| Methyltrimethoxysilane, g/100 g silica | 20 | 20 | 20 | 20 | 0 | 5 | 10 | 15 | 20 |
| Property: | | | | | | | | | |
| Haake Final Torque, mg | 2064 | 2218 | 2285 | 2474 | Crumbled | Crumbled | 2791 | 2208 | 2285 |
| Mill Softening Time, seconds | 0 | 0 | 0 | 15 | >180 | >180 | 35 | 0 | 0 |
| Williams Plasticity Number | | | | | | | | | |
| Initial | 175 | 165 | 201 | 282 | 505 | 635 | 302 | 190 | 165 |
| After 1 week | 203 | 208 | 236 | 325 | 538 | 624 | 356 | 239 | 196 |
| After 1 month | 236 | 221 | 254 | 338 | 574 | 645 | 378 | 259 | 216 |
| Williams Plasticity, Recovery | | | | | | | | | |
| Initial | 10 | 3 | 10 | 10 | 36 | 48 | 15 | 8 | 8 |
| After 1 week | 10 | 13 | 15 | 36 | 127 | 84 | 41 | 18 | 8 |
| After 1 month | 36 | 33 | 46 | 71 | 254 | 104 | 51 | 23 | 10 |
| Property after cure | | | | | | | | | |
| Durometer, Shore A | 42 | 43 | 47 | 51 | 53 | 58 | 48 | 44 | 42 |
| Tensile Strength, mPa | 6.5 | 6.8 | 7.3 | 4.8 | 5.7 | 5.6 | 6 | 5.7 | 6.1 |
| Elongation, percent | 379 | 389 | 369 | 276 | 258 | 261 | 303 | 349 | 396 |
| 200% Modulus, mPa | 2.2 | 2.3 | 2.7 | 3 | 3.8 | 3.9 | 3.1 | 2.3 | 2.1 |
| Property after Heat Age, 70 hr/225° C. | | | | | | | | | |
| Durometer, Shore A | | | | | | 53 | 47 | 48 | 44 |
| Durometer Change | | | | | | −6 | −1 | 4 | 2 |
| Tensile Strength, mPa | | | | | | 4.2 | 4.1 | 4.2 | 4.1 |
| Tensile % Change | | | | | | −25.2 | −31.7 | −25.8 | −32 |
| Elongation, percent | | | | | | 268 | 252 | 201 | 212 |

TABLE II-continued

| Run Number | 1 | 2 | 3 | 4* | 5* | 6 | 7 | 8 | 9 |
|---|---|---|---|---|---|---|---|---|---|
| Elongation % Change | | | | | | 2.7 | −17.1 | −42.4 | −47 |

COMPARATIVE EXAMPLE

This example illustrates the prior art use of ammonia as a catalyst to promote filler treatment with methyltrimethoxysilane.

First 125 g of fumed silica with a surface area of 255 m$^2$/g and a moisture content of 2.2 percent(established by measuring weight loss on heating for 1 hour at 105 ° C.) was placed in a one gallon stainless steel Waring Blender and agitated at a slow speed through the use of a Variac in the line to slow the motor. The stirrer was operated at a speed just sufficient to fluidize the silica in the blender. Then 0.2 g of NH3 was added from a lecture bottle through a calibrated flow meter. The NH3 was allowed to mix with the silica for 3 minutes, then 25 g of methyltrimethoxysilane was injected into the fluidized silica. The fluidization was continued for 3 minutes, then the blender was turned off.

A second run was prepared using the same method, but the amount of ammonia was doubled. The comparative compositions were evaluated as in example 1. The results show that these materials catalyzed with ammonia have inferior heat aging results when compared to the results shown in the previous and subsequent examples under this invention, particularly in the percent of tensile strength and percent of elongation lost when the elastomers are aged for 70 hours at 225° C.

TABLE III

| | | |
|---|---|---|
| NH$_3$, g per 100 g silica | 0.16 | 0.32 |
| Methyltrimethoxysilane, g | 20 | 20 |
| Property: | | |
| Haake Final Torque, mg | 2335 | 2245 |
| Mill Softening Time, seconds | 7 | 5 |
| Williams Plasticity Number | | |
| Initial | 221 | 201 |
| After 1 week | 249 | 231 |
| After 1 month | 267 | 251 |
| Williams Plasticity, Recovery | | |
| Initial | 5 | 8 |
| After 1 week | 13 | 10 |

TABLE III-continued

| | | |
|---|---|---|
| After 1 month | 20 | 18 |
| Property after Cure | | |
| Durometer, Shore A | 49 | 45 |
| Tensile Strength, mPa | 6.9 | 6.5 |
| Elongation, percent | 374 | 373 |
| 200% Modulus, mPa | 2.6 | 2.4 |
| Property after Heat Age, 70 hr/225° C. | | |
| Durometer, Shore A | 53 | 49 |
| Durometer Change | 4 | 4 |
| Tensile Strength, mPa | 3.78 | 3.2 |
| Tensile % Change | −45.2 | −51.1 |
| Elongation, percent | 155 | 138 |
| Elongation % change | −58.6 | −63 |

EXAMPLE 3

This examPle illustrates !he use of methyltrichlorosilane as a catalyst to treat fume silica with an alkoxysilane.

First, 125 g of fumed silica of example 1 was fluidized in a Waring Blender. Then 12.5 g of methyltrimethoxysilane is added and mixed for 3 minutes, at which time the mixer was turned off. A second run was made in the same manner using 25 g methyltrimethoxysilane. A third and fourth run were also done using this procedure. Again, the quantity of methyltrimethoxysilane was 12.5 and 25 g respectively. The difference being that the methyltrimethoxysilane used in the third and fourth runs contained 0.25 g methyltrichlorosilane per 99.75 g methyltrimethoxysilane.

The treated silica was evaluated as a reinforcing filler as stated in Example 1. A comparison of the results, as shown in in Table IV shows an increase in methyltrimethoxysilane corresponds with a more efficient treatment on the filler. The basis for this statement is the same as stated in example 2. Also, the addition of methytrichlorosilane to the methyltrimethoxysilane improves the efficiency of the filler treatment for the same reasons.

TABLE IV

| Treating Agent: | Comparative MeSi(OMe)3 | *MeSi(OMe)3 | Comparative MeSi(OMe)3 | *MeSi(OMe)3 |
|---|---|---|---|---|
| Treating Agent, g:100 g Silica | 10 | 10 | 20 | 20 |
| Property: | | | | |
| Haake Final Torque, mg | Crumbled | 3697 | 3019 | 2260 |
| Mill Softening Time, seconds | 150 | 155 | 60 | 5 |
| Williams Plasticity Number | | | | |
| Initial | 660 | 587 | 366 | 290 |
| After 1 week | 737 | 691 | 439 | 356 |
| After 1 month | 765 | — | 460 | — |
| Williams Plasticity, Recovery | | | | |
| Initial | 25 | 38 | 13 | 18 |
| After 1 week | 122 | 104 | 38 | 25 |
| After 1 month | 145 | — | 61 | — |
| Property after Cure | | | | |
| Durometer, Shore A | 63 | 59 | 55 | 51 |
| Tensile Strength, mPa | 7.76 | 5.78 | 6.52 | 6.22 |
| Elongation, percent | 320 | 277 | 312 | 329 |
| 200% Modulus, mPa | 4.16 | 3.77 | 3.47 | 2.97 |
| Property after Heat Age, 70 hr/225° C. | | | | |
| Durometer, Shore A | 56 | 56 | 49 | 58 |
| Durometer Change | −7 | −3 | 6 | 7 |
| Tensile Strength, mPa | 5.3 | 4.34 | 4.03 | 4.45 |
| Tensile % Change | −32 | −24.9 | −38 | −28.5 |
| Elongation, percent | 310 | 255 | 255 | 252 |

TABLE IV-continued

| Treating Agent: | Comparative MeSi(OMe)3 | *MeSi(OMe)3 | Comparative MeSi(OMe)3 | *MeSi(OMe)3 |
| --- | --- | --- | --- | --- |
| Elongation % change | 3 | −7.9 | −18 | −23.4 |

*contains 0.25 g MeSiCl3 per 100 g methyltrimethoxysilane

EXAMPLE 4

This example illustrates the use of small amounts of methyltrichlorosilane and hexamethyldisilazane together as catalysts to promote the treatment of fume silica with methyitrimethoxysilane. This is a preferred method of treating fume silica. A preferred method of treating fume silica is the use of dimethyldimethoxysilane as the treating agent and small amounts of methyltrichlorosilane and hexamethyldisilazane as the catalysts.

First, 125 g of fumed silica of example 1 was fluidized in a Waring Blender as described in the that example. Then 0.31 g of hexamethydisilazane was injected and mixed 3 minutes. Immediately following this, 12.5 g of methyl trimethoxysilane containing 0.25 g methyltrichlorosilane per 99 75 g methyltrimethoxysilane was added and mixed 3 additional minutes. The blender was then turned off. This is shown as run 2. The procedure was repeated in a second and third run with the level of methyltrimethoxysilane being 18.5 and 25 g, shown as run 4 and run 6.

The treated filler was evaluated as a reinforcing filler in the same manner described in Example 1. A comparison of these three runs is shown in Table V along with three comparative runs(1,3,5) which were not catalyzed with hexamethyldisilazane. This comparison shows the addition of 0.25 g of hexamethyldisilazane enhances the filler treatment for the same reasons stated in Example 3. In addition to the improvement in the overall properties discussed in all prior examples, we see an added benefit in the use of this filler treatment for a reinforcing filler to be used in an elastomer in a hot air vulcanization process where the compression set may be important. A comparison of the compression set data of the elastomers catalyzed with 2,4 dichlorobenzoyl peroxide (a hot air vulcanizing peroxide) and compounded using treated filler from runs 2, 4, and 6 and the comparative runs where hexamethyldisilazane was not used is shown in Table V. This data shows a significant difference between the three runs containing hexamethyldisilazane and the three runs not containing hexamethyldisilazane. The difference is seen as an improvement in the compression set where the filler from runs 2, 4, and 6 was used while the compression set gets worse with increasing amounts of treating agent containing chlorosilane in the absence of hexamethyldisilazane.

TABLE V

| Run Number | 1* | 2 | 3* | 4 | 5* | 6 |
| --- | --- | --- | --- | --- | --- | --- |
| Treating Agent, g/100 g Silica | 10 | 10 | 15 | 15 | 20 | 20 |
| (Me3Si)2NH, g/100 g Silica | 0 | 0.25 | 0 | 0.25 | 0 | 0.25 |
| Property: | | | | | | |
| Haake Final Torque, mg | 3697 | 3325 | 2883 | 2923 | 2260 | 2451 |
| Mill Softening Time, seconds | 155 | 121 | 67 | 45 | 5 | 22 |
| Williams Plasticity Number | | | | | | |
| Initial | 587 | 516 | 455 | 381 | 290 | 269 |
| After 1 week | 691 | 569 | 521 | 455 | 356 | 320 |
| After 1 month | 706 | 577 | 551 | 465 | 396 | 363 |
| Williams Plasticity, Recovery | | | | | | |
| Initial | 38 | 30 | 28 | 23 | 18 | 20 |
| After 1 week | 104 | 61 | 48 | 46 | 25 | 25 |
| After 1 month | 135 | 81 | 84 | 43 | 28 | 36 |
| Property after Cure | | | | | | |
| Durometer, Shore A | 59 | 54 | 56 | 50 | 51 | 46 |
| Tensile Strength, mPa | 5.78 | 6.91 | 6.24 | 6.38 | 6.22 | 6.2 |
| Elongation, percent | 277 | 318 | 287 | 313 | 329 | 334 |
| 200% Modulus, mPa | 3.77 | 3.41 | 3.75 | 2.87 | 2.97 | 2.54 |
| Compression Set, % | | | | | | |
| 0.7 pph Lupersol 101 | 38.5 | 42.6 | 40.4 | 38.9 | 43.6 | 33.6 |
| 1.3 pph Cadox TS-50 | 59.2 | 52.9 | 64.8 | 51.2 | 73.1 | 47.4 |
| Property after Heat Age, 70 hr/225° C. | | | | | | |
| Durometer, Shore A | 56 | 55 | 55 | 54 | 58 | 51 |
| Durometer Change | −3 | 1 | −1 | 4 | 7 | 5 |
| Tensile Strength, mPa | 4.34 | 4.59 | 5 | 4.9 | 4.45 | 5.04 |
| Tensile % Change | 24.9 | −33.6 | −19.8 | −23.1 | −28.5 | −18.7 |
| Elongation, percent | 255 | 258 | 255 | 228 | 252 | 272 |
| Elongation % change | −7.9 | −18.9 | −11.1 | −27.1 | −23.4 | −18.6 |

*comparative run

In run 7, 125 g of fumed silica of example 1 was fluidized in a Waring Blender as described in the same example. Then 2 g of hexamethyldisilazane was injected and mixed 3 minutes. Immediately following this, 12 5 g of dimethyldimethoxysilane was added and mixed 3 additional minutes. Run 8 was a repeat of run 7 with the exception being that the dimethyldimethoxysilane contained sufficient dimethyldichlorosilane to give 1850 ppm chlorine attached to silicon.

The two treated fillers were evaluated in the same manner as described in example 1. A comparison of the data is shown in Table V, cont. Again, we see an improvement in the compression set of the elastomer vulcanized with the hot air vulcanizing (HAV) peroxide.

TABLE V, Cont.

| Run Number | 7 | 8 |
| --- | --- | --- |
| Treating Agent: | Me2Si(OMe)2 | Me2Si(OMe)2 |

TABLE V, Cont.-continued

| Run Number | 7 | 8 |
|---|---|---|
| | | plus dimethyldichlorosilane |
| Treating Agent, g/100 g Silica | 10 | 10 |
| (Me$_3$Si)$_2$NH, g/100 g Silica | 2 | 2 |
| Property: | | |
| Haake Final Torque, mg | 2372 | 2585 |
| Mill Softening Time, seconds | 31 | 41 |
| Williams Plasticity Number | | |
| Initial | 213 | 241 |
| After 1 week | 269 | 310 |
| After 1 month | 290 | 345 |
| Williams Plasticity, Recovery | | |
| Initial | 15 | 20 |
| After 1 week | 30 | 36 |
| After 1 month | 66 | 66 |
| Property after Cure | | |
| Durometer, Shore A | 42 | 43 |
| Tensile Strength, mPa | 8.78 | 8.94 |
| Elongation, percent | 447 | 466 |
| 200% Modulus, mPa | 2.42 | — |
| Compression Set, % | | |
| 0.7 pph Lupersol 101 | 30.2 | 28.9 |
| 1.3 pph Cadox TS-50 | 62.6 | 46.5 |
| Property after Heat Age, 70 hr/225° C. | | |
| Durometer, Shore A | 39 | 46 |
| Durometer Change | −3 | 3 |
| Tensile Strength, mPa | 4.66 | 5.71 |
| Tensile % Change | −46.9 | −36 |
| Elongation, percent | 266 | 306 |
| Elongation % change | −40.5 | −34 |

EXAMPLE 6

This example illustrates the alkoxysilane treatment of fumed silica in the presence of 0.9 to 7 percent moisture on the filler surface prior to treatment.

First, 125 g each of fumed silica of example 1 was equilibrated for 12 days in an environmental chamber at 21.2, 39.7, 72, and 84 percent relative humidity. The moisture on the silica following the equilibration was determined to be 0.89, 1.85, 4.29, and 6.89 percent after 1 hour at 105 C. Then, 125 g of the first equilibrated silica was fluidized in a Waring blender as described in example 1. Special care was taken to assure the change in the moisture on the silica was minimized during this time. The procedure used was to immediately fluidize the silica following its removal from the environmental chamber. Then, 3.2 g of hexamethyldisilazane was added and mixed for 3 minutes. This was followed by injecting 12.5 g of methyltrimethoxysilane and continuing mixing for 3 additional minutes. The mixer was then turned off. The same procedure was used for the other 3 equilibrated silicas.

Each treated silica was evaluated as a reinforcing filler as stated in example 1. A comparison of the results in Table VI shows the influence of the moisture on the silica surface prior to treatment. This is seen in the lowest moisture on the silica surface corresponding with the shortest mill softening time for the base compounded with this silica. It also can be seen in the Haake final torque, plasticity and recovery of the base. These properties increase correspondingly with an increase in the moisture content on the filler surface prior to treatment. No significant difference in the cured elastomers could be seen except for the elastomer compounded with the silica which had 6.89 percent moisture on the surface. The properties of this elastomer were somewhat poorer as seen in a loss in the tensile strength.

TABLE VI

| | | | | | |
|---|---|---|---|---|---|
| Environmental Chamber % Humidity | 21.2 | 39.7 | 72 | 84* | 0* |
| Moisture on silica prior to treatment, % | 0.89 | 1.85 | 4.29 | 6.89 | >0 |
| Property: | | | | | |
| Haake Final Torque, mg | 2927 | 3126 | 3200 | 3025 | 3011 |
| Mill Softening Time, seconds | 82 | 127 | 181 | 210 | 85 |
| Williams Plasticity Number | | | | | |
| Initial | 320 | 350 | 368 | 389 | 401 |
| After 1 week | 401 | 450 | 457 | 460 | 462 |
| After 1 month | 432 | 462 | 475 | 485 | 480 |
| Williams Plasticity, Recovery | | | | | |
| Initial | 18 | 15 | 20 | 23 | 15 |
| After 1 week | 53 | 64 | 94 | 84 | 45 |
| After 1 month 79 | 107 | 193 | 168 | 58 | |
| Property after Cure | | | | | |
| Durometer, Shore A | 51 | 51 | 50 | 50 | 53 |
| Tensile Strength, mPa | 7.46 | 7.64 | 6.61 | 5.56 | 7.72 |
| Elongation, percent | 335 | 349 | 327 | 292 | 352 |
| 200% Modulus, mPa | 3.44 | 3.3 | 3.08 | 3.13 | 3.44 |
| Property after Heat Age, 70 Hr/225° C. | | | | | |
| Durometer, Shore A | 51 | 52 | 50 | 50 | 52 |
| Durometer Change | 0 | 1 | 0 | 0 | −1 |
| Tensile Strength, mPa | 5.24 | 5.09 | 5.12 | 4.49 | 4.1 |
| Tensile % Change | −30 | −34 | −23 | −19 | −46.8 |
| Elongation, percent | 264 | 267 | 281 | 268 | 232 |
| Elongation % change | −21 | −24 | −14 | −8 | −34 |

*comparative example

EXAMPLE 7

This example illustrates the catalytic influence hexamethyldisilazane has on the treatment of fumed silica with dimethyldimethoxysilane.

First, 125 g of fumed silica of example 1 was fluidized in a Waring Blender. Then, the amount of hexamethyldisilazane stated in Table VII was injected and mixed for 3 minutes. Then, 12.5 g of dimethyldimethoxysilane was injected and mixing continued for 3 more minutes. At this time, the mixer was turned off.

The treated silicas were evaluated as reinforcing fillers as described in example 1. A comparison of the results in Table VII shows an increase in hexamethyldisilazane corresponds with an increase in filler treatment. The basis for this statement is the same as stated in example 2. It also shows that an amount as low as 0.1 g of hexamethyldisilazane per 100 g silica significantly changes the rheology of the corresponding base as seen in a comparison of the Haake torque and plasticity of this base and the comparative run where no hexamethyldisilazane was used.

TABLE VII

| | (comparative) | | | | | |
|---|---|---|---|---|---|---|
| Hexamethyldisilazane Level: g:100 g Silica | 0 | 0.1 | 0.25 | 0.5 | 1 | 2 |
| Property: | | | | | | |
| Haake Final Torque, mg | 3771 | 3011 | 2806 | 2781 | 2594 | 2372 |
| Mill Softening Time, seconds | 86 | 45 | 37 | 60 | 48 | 31 |
| Williams Plasticity Number | | | | | | |
| Initial | 513 | 323 | 330 | 287 | 249 | 213 |

TABLE VII-continued (comparative)

|  |  |  |  |  |  |  |
|---|---|---|---|---|---|---|
| After 1 week | 536 | 381 | 366 | 348 | 318 | 269 |
| After 1 month | 559 | 396 | 376 | 368 | 333 | 290 |
| Williams Plasticity, Recovery | | | | | | |
| Initial | 41 | 13 | 18 | 15 | 13 | 15 |
| After 1 week | 64 | 38 | 36 | 36 | 41 | 30 |
| After 1 month | 124 | 64 | 58 | 64 | 66 | 66 |
| Property after Cure | | | | | | |
| Durometer, Shore A, 59 | 53 | 50 | 50 | 47 | 42 |  |
| Tensile Strength, mPa | 6.66 | 8.12 | 8.78 | 8.08 | 8.69 | 8.78 |
| Elongation, percent | 291 | 349 | 363 | 362 | 399 | 447 |
| 200% Modulus, mPa | 3.98 | 3.47 | 3.51 | 3.23 | 2.92 | 2.42 |
| Property after Heat Age, 70 hr/22° C. | | | | | | |
| Durometer, Shore A | 51 | 48 | 46 | 45 | 45 | 39 |
| Durometer Change | −8 | −5 | −4 | −5 | −2 | −3 |
| Tensile Strength, mPa | 4.69 | 4.21 | 4.12 | 4.4 | 4.48 | 4.60 |
| Tensile % Change | −29.5 | −48.16 | −53.02 | −45.49 | −48.5 | −46.9 |
| Elongation, percent | 294 | 228 | 224 | 254 | 248 | 266 |
| Elongation % change | 1.03 | −34.67 | −38.29 | −29.83 | −37.84 | −40.49 |

EXAMPLE 8

This example illustrates the treatment of a precipitated silica with methyltrimethoxysilane catalyzed with methyltrichlorosilane and hexamethyldisilazane.

First, 125 grams of precipitated reinforcing silica was fluidized in a Waring Blender as described in example 1. The precipitated silica had a surface area of about 160 $m_2/g$ and a pH of 4.5 It was obtained under the designation of FK 160 from Degussa Corporation, Pigment Division, of Teterborough, N.J. Then 0.20 g of hexamethyldisilazane was injected and mixed 3 minutes. Immediately following this a mixture of 8 grams of methyltrimethoxysilane and 0.02 gram of methyltrichlorosilane was added and mixed for 3 minutes. The blender was then turned off.

The treated filler was evaluated as a reinforcing filler in the same manner as is described in example 1. A comparative run was done in the same manner, but using a sample of the precipitated filler without any treatment. The results are shown in Table VIII. A comparison of the properties shows that the treated filler has a lower plasticity initially and after aging than the untreated filler.

TABLE VIII

|  | Untreated Filler | Treated Filler |
|---|---|---|
| Property: | | |
| Mill Softening Time, seconds | 18 | 12 |
| Williams Plasticity Number | | |
| Initial | 310 | 272 |
| After 1 week | 373 | 323 |
| After 1 month | 401 | 353 |
| Williams Plasticity, Recovery | | |
| Initial | 15 | 13 |
| After 1 week | 43 | 18 |
| After 1 month | 79 | 38 |
| Property after Cure | | |
| Durometer, Shore A | 52 | 48 |
| Tensile Strength, mPa | 4.76 | 3.73 |
| Elongation, percent | 270 | 254 |
| 200% Modulus, mPa | 3.25 | 2.76 |
| Property after Heat Age, 70 hr/225° C. | | |
| Durometer, Shore A | 48 | 45 |
| Durometer Change | −4 | −3 |
| Tensile Strength, mPa | 4.14 | 2.90 |
| Tensile % Change | −13 | −22 |
| Elongation, percent | 267 | 217 |
| Elongation % change | −1 | −15 |

That which is claimed is:

1. A method of rapidly treating the surface of reinforcing silica filler consisting essentially of mixing, at a temperature of from about −10° to 130° C.,
   (A) 100 parts by weight of reinforcing silica filler, having a surface area of greater than 50 $m^2/g$, and having from 0.5 to 6 parts by weight of absorbed moisture,
   (B) from 3 to 30 parts by weight of volatile treating agent of the formula $R_xSi(OR')_{4-x}$, wherein R is a alkyl, alkenyl, or aryl radical having from 1 to 6 carbon atoms which may be substituted with halogen atoms, R' is an alkyl radical having from 1 to 3 carbon atoms, x is 1 or 2, and R and R' are chosen so that the vapor pressure of the alkoxysilane exceeds 10 Pa at treatment temperature,
   (C) from 0.001 to 5.0 parts by weight of volatile catalyst selected from the group consisting of base B, and mixtures of acid A and base B, wherein acid A is a volatile acid or acid progenitor, and base B is a silylamine or silazane, acid A and base B being chosen so that the vapor pressure of either acid A or base B exceeds 500 Pa at treatment temperature, for a period of time sufficient to allow the desired amount of treating agent to be adsorbed onto the surface of the particulate filler,
to yield a filler which requires a minimum of energy to disperse rapidly into polydiorganosiloxane and which gives improved properties to cured silicone elastomers.

2. The method of claim 1 in which the mixing is in the form of a stirred or fluidized bed in a container purged with an inert gas, the treatment temperature is from about 10° to 30° C., and the treatment time is from 3 to 10 minutes.

3. The method of claim 2 in which R and R' are methyl radical.

4. The method of claim 1 in which base B is selected from the group consisting of $(R''_3Si)_2NR''$, $(R''_3Si)_2NH$, $R''_3SiNR''_2$, and $R''_3SiNHR''$, where R'' is an alkyl radical having from 1 to 3 carbon atoms.

5. The method of claim 1 in which the volatile catalyst is admixed with the reinforcing silica filler before the mixing of the volatile treating agent.

6. The method of claim 3 in which the treating agent is $Me_2Si(OMe)_2$, where Me represents methyl radical.

7. The method of claim 6 in which the catalyst is $(Me_3Si)_2NH$.

8. The method of claim 3 in which the treating agent is $MeSi(OMe)_3$.

9. The method of claim 8 in which the catalyst is (Me$_3$Si)$_2$NH.

10. The method of claim 3 in which the catalyst is a mixture of MeSiCl$_3$ and (Me$_3$Si)$_2$NH.

11. The method of claim 6 in which the catalyst is a mixture of MeSiCl$_3$ and (Me$_3$Si)$_2$NH.

12. The method of claim 8 in which the catalyst is a mixture of MeSiCl$_3$ and (Me$_3$Si)$_2$NH.

13. The method of claim 6 in which the catalyst is a mixture of Me$_2$SiCl$_2$ and (Me$_3$Si)$_2$NH.

14. The method of claim 8 in which the catalyst is a mixture of Me$_2$SiCl$_2$ and (Me$_3$Si)$_2$NH.

15. The method of claim 10 in which the treating agent is a mixture of MeSi(OMe)$_3$ and Me$_2$Si(OMe)$_2$.

16. The method of claim 11 in which the treating agent is a mixture of MeSi(OMe)$_3$ and Me$_2$Si(OMe)$_2$.

17. The method of claim 12 in which the treating agent is a mixture of MeSi(OMe)$_3$ and Me$_2$Si(OMe)$_2$.

18. The treated silica produced by the method of claim 1.

19. The treated silica produced by the method of claim 10.

20. The treated silica produced by the method of claim 11.

21. The treated silica produced by the method of claim 12.

22. The treated silica produced by the method of claim 13.

23. The treated silica produced by the method of claim 14.

24. The treated silica produced by the method of claim 15.

25. Silicone elastomer containing treated silica filler produced by the method of claim 1.

26. A silicone elastomer containing the treated silica of claim 19.

27. A silicone elastomer containing the treated silica of claim 20.

28. A silicone elastomer containing the treated silica of claim 21.

29. A silicone elastomer containing the treated silica of claim 22.

30. A silicone elastomer containing the treated silica of claim 23.

31. A silicone elastomer containing the treated silica of claim 24.

* * * * *